(12) United States Patent
Chien et al.

(10) Patent No.: US 8,505,528 B2
(45) Date of Patent: Aug. 13, 2013

(54) COMBINED TYPE OF BARBEQUE OVEN

(75) Inventors: Hsien Chih Chien, Huizhou (CN); Chih Jen Lin, Huizhou (CN)

(73) Assignee: Huizhou Sun Moon Metal & Wooden Product Co., Ltd (CN)

( * ) Notice: Subject to any disclaimer, the term of this patent is extended or adjusted under 35 U.S.C. 154(b) by 59 days.

(21) Appl. No.: 13/244,504

(22) Filed: Sep. 25, 2011

(65) Prior Publication Data

US 2013/0074822 A1  Mar. 28, 2013

(51) Int. Cl.
*F24B 3/00* (2006.01)

(52) U.S. Cl.
USPC .............. 126/25 R; 126/30; 126/26; 126/9 R; 126/9 B

(58) Field of Classification Search
USPC ............... 126/25 R, 30, 26, 9 R, 9 B, 38, 52, 126/40, 39 B, 50
See application file for complete search history.

(56) References Cited

U.S. PATENT DOCUMENTS 6,910,475 B2 * 6/2005 Zelek et al. .................. 126/25 R
6,976,485 B2 * 12/2005 Johnson et al. .............. 126/41 R

* cited by examiner

*Primary Examiner* — Alfred Basichas
(74) *Attorney, Agent, or Firm* — Garcia-Zamor IP Law; Ruy M. Garcia-Zamor

(57) ABSTRACT

A combined type of barbecue oven comprises a barbecue oven and a coil base frame provided with rollers, the barbecue oven is mounted on the coil base frame, wherein the two ends of the supporting structure of the barbecue oven are provided with a foldable object placement plate. The object placement plate of the barbecue oven is foldable; therefore the occupying space is small. Moreover, the volume of the whole oven body is small, which is convenient for moving. When being moved in a short distance, the barbecue oven does not need to be moved, it only requires to mount the coil base frame with an inclined side and provided with the rollers and the barbecue oven on the coil base frame, so that the whole combined type of barbecue oven can be dragged to move; the barbecue oven is conveniently used, healthful, and suitable for being popularized.

10 Claims, 6 Drawing Sheets

G-G

COMBINED TYPE OF BARBEQUE OVEN

TECHNICAL FIELD

The utility model relates to a cooker, especially to a combined type of barbecue oven.

BACKGROUND ART

With the development of society and the diversification of leisure activities, barbecue is more and more popular in people's life. Barbecue oven is the necessary tool for barbecue activities, and at present, gas type barbecue oven and solid fuel type barbecue oven are usually used. Compared with the solid fuel type barbecue oven using wood charcoals as the main fuel, the combined type of barbecue oven is widely accepted for its advantages of clean, smokeless and no pollution to foods.

Barbecue ovens are usually provided with an object placement shelf for placing the raw materials or utensils for barbecue. The object placement shelves of the current barbecue oven are mostly disposed at one edge or one side of the barbecue ovens; when the barbecue oven is not used, the object placement shelf can not be folded, so that the whole volume of the barbecue oven is relatively big, the barbecue oven is not portable, and the unfolded object placement shelf is easy to be destroyed or polluted.

CONTENTS OF THE INVENTION

The invention aims to provide a combined type of barbecue oven, wherein the object placement shelf of the barbecue oven can be folded, so that the whole volume of the barbecue oven is small when the barbecue oven is not used, and the barbecue oven is carried easily.

In order to achieve said aims, the invention adopts the following technical scheme: a combined type of barbecue oven, comprising a barbecue oven which comprises an oven body opened at the underside, an oven cover, a supporting structure, an object placement device and an oil dripping plate, wherein the oven cover is mounted on the oven body which is mounted at the middle of the supporting structure; the object placement device is mounted at two sides of the supporting structure and located at two sides of the oven body; the oil dripping plate is mounted under the opening of the oven body; the combined type of barbecue oven is characterized in that:

1) the supporting structure comprises an X-shaped front supporting frame and a back supporting frame, wherein the front and back supporting frames are symmetrically, and comprise supporting arms located at the upper side and supporting feet located at the under side; the front supporting frame and the back supporting frame are oppositely disposed and connected by the connecting ribs on the supporting feet;
2) The object placement device:
a) Comprises an object placement plate, wherein one end of the object placement plate is wider than the other end;
b) the plate face of the object placement plate is upwardly, and the edges thereof are vertical to the back side direction and provided with reinforced edges; reinforced ribs vertical to the object placement plate is disposed between the reinforced edges;
c) The bottom end of the reinforced edge is symmetrically provided with two convex rotation shafts outwardly;
3) The combined type of barbecue oven further comprises a coil base frame provided with rollers at the bottom; the barbecue oven is mounted on the coil base frame.

The reinforced ribs are disposed in a longitudinal and transverse staggering manner.

The reinforced rib further comprises two reinforced ribs disposed along the diagonal of the object placement plate.

One side of the reinforced edges of the supporting plate close to the wider end of the object placement plate is the top end of the reinforced edge; and the side close to the narrower end of the object placement plate is the bottom end of the reinforced edge; the height of the top end of the reinforced edge is greater than that of the bottom end of the reinforced edge.

Two edges of the supporting arm are symmetrically provided with an object placement device supporting structure inwardly; the object placement device supporting structure:
a) Comprises a vertical slot where the object placement plate glides up and down, wherein the width of the vertical slot is between the height of the top end of the reinforced edge and the height of the bottom end.
b) One side of the vertical slot top facing to the inner side of the coil base frame is provided with a horizontal blind slot which can contain a rotation shaft at the lower end of the reinforced edge; one side of the vertical slot opposite to the horizontal blind slot is provided with an object placement plate supporting rod.

One end of the object placement plate supporting rod is fixed at the inner side of the supporting arm; and the other end is stretched out in a suspending manner.

The upper surface of the object placement plate supporting rod is a plane provided with a longitudinal slot.

The object placement plate supporting rod on the front supporting plate and the object placement plate supporting rod on the back supporting plate are disposed oppositely.

The coil base frame comprises a panel and four supporting legs mounted under the panel, wherein:
a) The panel is provided with a fixing structure capable of fixing the barbecue oven;
b) The length of two supporting legs located at one side is less than that of two supporting legs located at the other side; the two sides of bottoms of the two shorter supporting legs are each provided with a roller.

The fixing structure is composed of a supporting foot fixing slot where the barbecue oven supporting feet can be placed and a supporting foot fixing device mounted on the supporting foot fixing slot.

The supporting foot fixing device is composed of a pull ring, an elastic member and a fixing pin, wherein the pull ring and the fixing pin are fixedly connected and mounted on the pin hole at one side of the supporting foot fixing slot by the elastic member; the pull ring is mounted at the outer side of the supporting foot fixing slot; the fixing pin is mounted at the inner side of the supporting fixing slot; a fixing pin penetrating hole is disposed at the corresponding position on the supporting foot of the barbecue oven.

A groove capable of placing the oil dripping plate is further disposed at the centre of the panel.

The bottom of the groove is provided with an opening where a gas pipeline or an electric line passes through.

The two rollers are in the same size and are symmetrically mounted; the radius of the rollers is not less than the length difference of the long supporting legs and the short supporting legs.

The two rollers pass through the roller rotation shafts of two short supporting legs to be mounted.

The lower ends of the four supporting legs are further provided with an object placement net rack. The object placement net rack can be used for placing objects like a gas furnace, and playing a role of strengthening the stability of the coil base frame.

The object placement net rack is fixedly mounted on the horizontal plane where the roller rotation shafts are at.

The object placement net racks are metal members.

The invention is advantaged in that: 1, the occupying space of the object placement plate is small. The object placement plate is vertically placed when it is not used; the height of the reinforced edge top end is greater than the width of the vertical slot, and the width of the vertical slot is less than the height of the reinforced edge lower end, so that the object placement plate can be vertically placed in the vertical slot without falling off; when it is used, the object placement plate is pulled and raised; when the bulge at the reinforced edge lower end of the pulled object placement plate is aligned to the horizontal blind slot at one side of the vertical slot, the object placement plate is turned outwardly to enable the panel to be upward; after being erected on the object placement plate supporting rod, the reinforced ribs of the object placement plate push the object placement plate inwardly, and the bulge at the lower ends of the reinforced edge enters the horizontal blind slot, thereby completing the unfolding of the object placement plate for use; the operations are convenient and fast. 2. The whole oven body is with a small volume and convenient to be moved. When being moved in a short distance, the barbecue oven does not need to be moved, it only requires to mount the coil base frame with an inclined side and provided with the roller and the barbecue oven on the coil base frame, so that the whole combined type of barbecue oven can be dragged to move.

MODE OF CARRYING OUT THE INVENTION

The utility model is further described in details combining with figures and embodiments.

Figure 1:
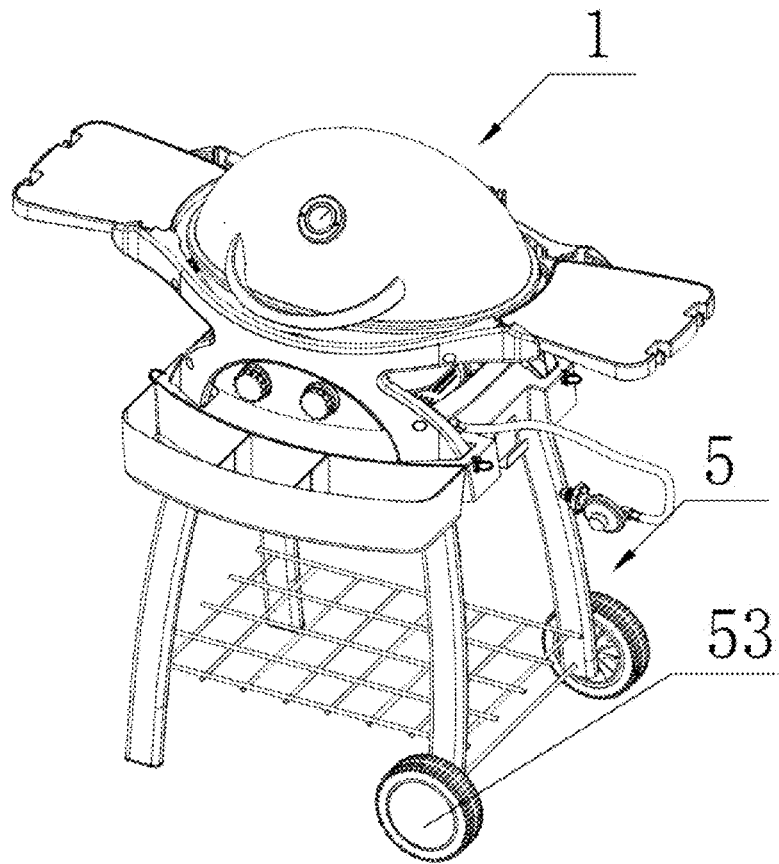
FIG. 1 is the front view of the combined type of barbecue oven of the invention.
Figure 2:
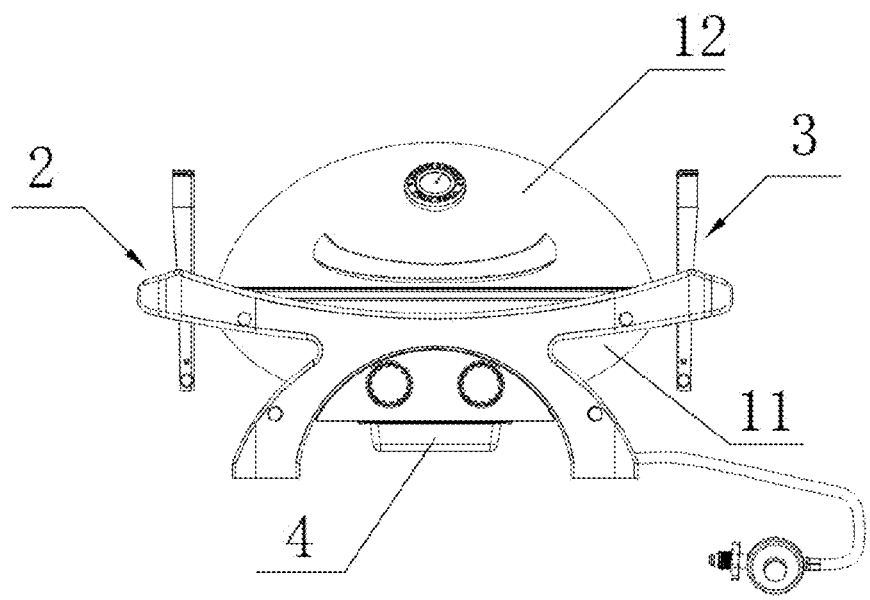
FIG. 2 is the main view of the folding state of the barbecue oven.
Figure 3:
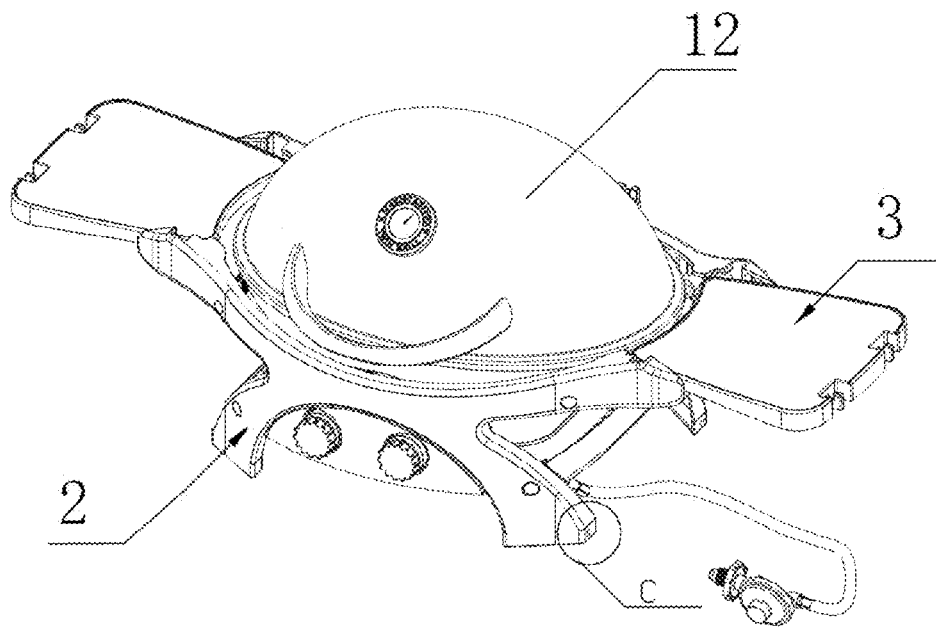
FIG. 3 is the use state space diagram of the barbecue oven.
Figure 4:
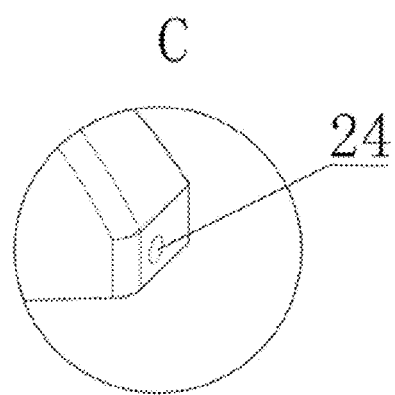
FIG. 4 is the partial enlarged drawing of FIG. 3.
Figure 5:
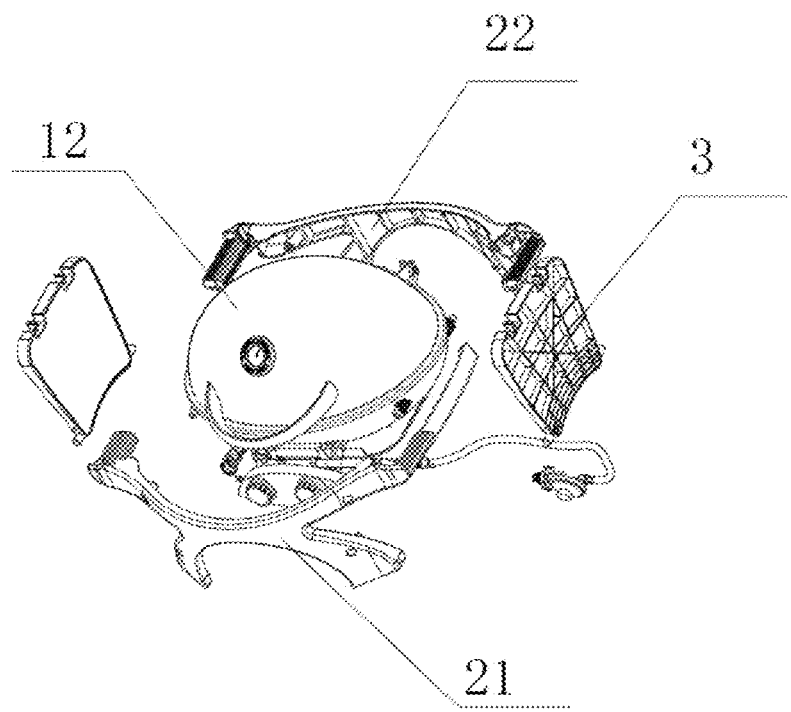
FIG. 5 is the explosive view of the barbecue oven.
Figure 6:
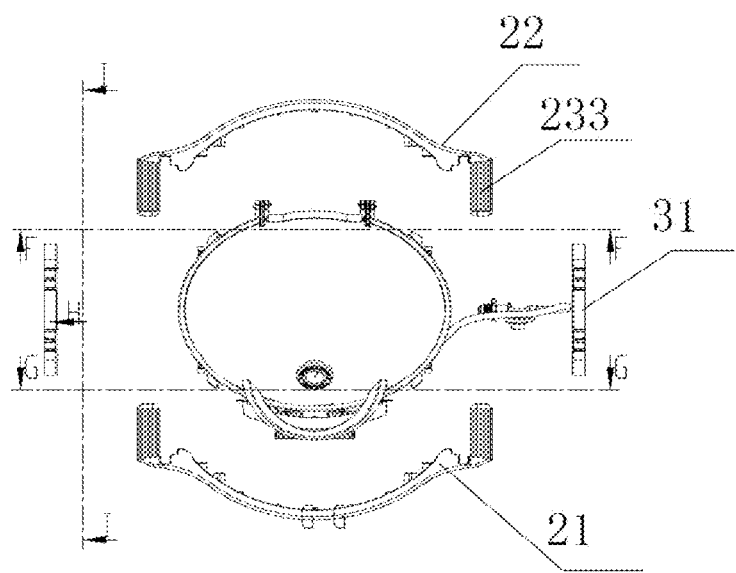
FIG. 6 is the top view of FIG. 5.
Figure 7:
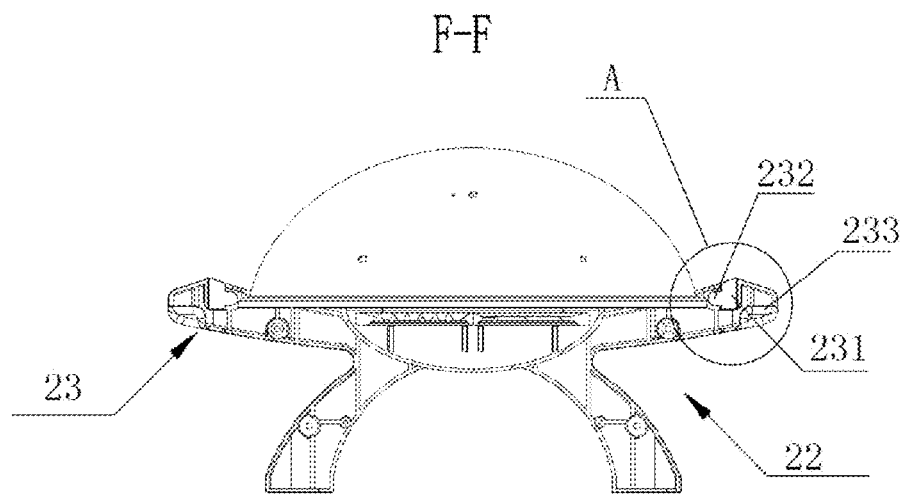
FIG. 7 is the F-F view of FIG. 6.
Figure 8:
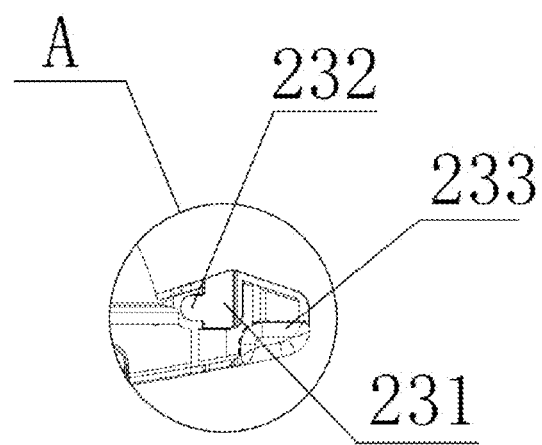
FIG. 8 is the partial enlarged drawing of FIG. 6.
Figure 9:
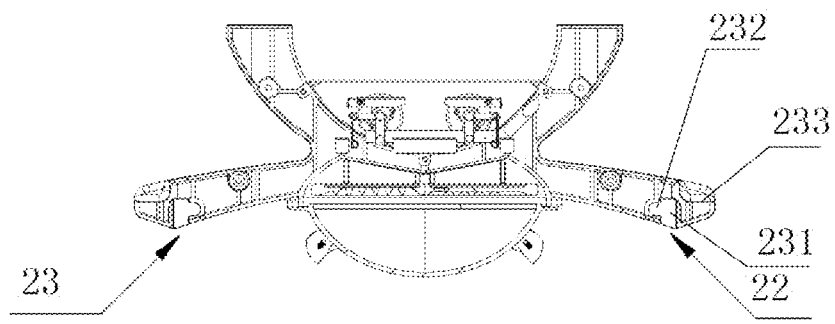
FIG. 9 is the G-G view of FIG. 6.
Figure 10:
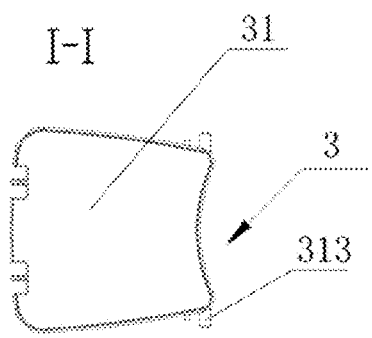
FIG. 10 is the I-I view of FIG. 6.
Figure 11:
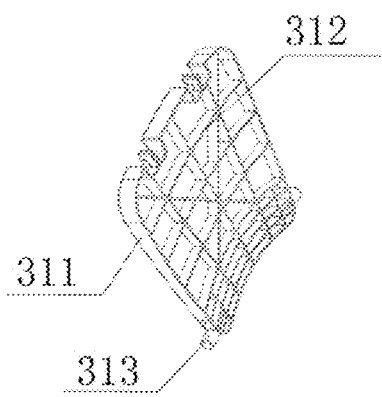
FIG. 11 is the space diagram of the object placement plate.
Figure 12:
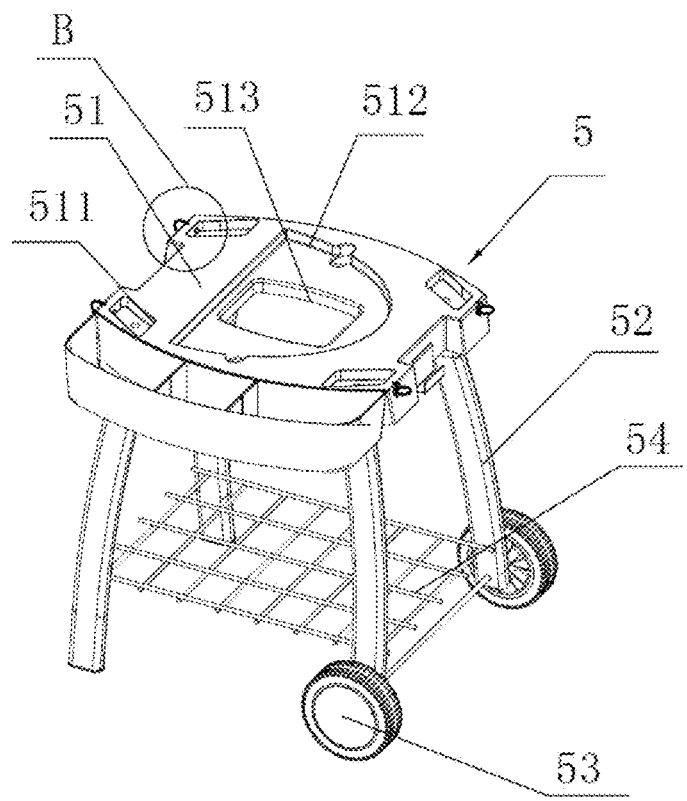
FIG. 12 is the space diagram of the coil base frame.
Figure 13:
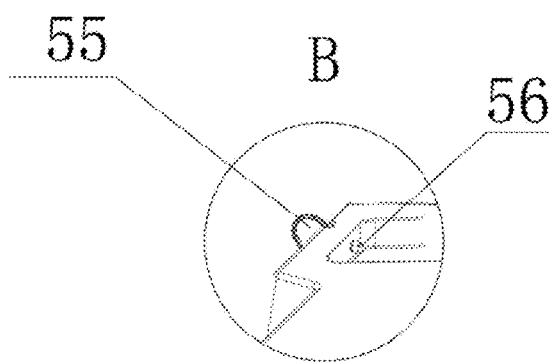
FIG. 13 is the partial enlarged drawing of the coil base frame.

The combined type of barbecue oven shown in FIG. 1 to FIG. 3 comprises a barbecue oven 1 and a coil base frame 5 provided with a roller 53 at the bottom; the barbecue oven 1 is mounted on the coil base frame 5. The barbecue oven 1 comprises an oven body 11 opened at the underside, an oven cover 12, a supporting structure 2, an object placement device 3 and an oil dripping plate 4, wherein the oven cover 12 is mounted on the oven body 11 which is mounted at the middle of the supporting structure 2; the object placement device 3 is mounted at two sides of the supporting structure 2 and located at two sides of the oven body 11; the oil dripping plate 4 is mounted under the opening of the oven body 11, wherein:

The supporting structure 2 comprises an X-shaped front supporting frame 21 and a back supporting frame 22, wherein the front and back supporting frames 21 and 22 are symmetrically, and comprise supporting arms located at the upper side and supporting feet located at the under side; the front supporting frame 21 and the back supporting frame 22 are oppositely disposed and connected by the connecting ribs 23 on the supporting feet;

The object placement device 3 comprises an object placement plate 31, wherein one end of the object placement plate 31 is wider the other end; the plate face of the object placement plate 31 is upwardly, and the edges thereof are vertical to the back side direction and provided with reinforced edges 311; one side of the reinforced edges 311 close to the wider end of the object placement plate 31 is the top end of the reinforced edge; and the side thereof close to the narrower wide of the object placement plate is the bottom end of the reinforced edge; the height of the reinforced edge top end is greater than the height of the reinforced edge bottom end; reinforced ribs 312 vertical to the object placement plate is disposed between the reinforced edges 311; there are a plurality of reinforced ribs 312 which are disposed in a longitudinal and transverse staggering manner, and two reinforced ribs 312 are disposed in an intersecting manner along the diagonal of the object placement plate; the bottom ends of the reinforced edges 311 are symmetrically provided with two convex rotation shafts outwardly;

Two edges of the supporting arm are symmetrically provided with an object placement device supporting structure 23 inwardly; the object placement device supporting structure 23 comprises a vertical slot 231 where the object placement plate 31 glides up and down, wherein the width of the vertical slot 231 is between the height of the top end of the reinforced edge and the height of the bottom end thereof; one side of the vertical slot 231 top facing to the inner side of the coil base frame is provided with a horizontal blind slot 232 which can contain a rotation shaft 313 at the lower end of the reinforced edge; one side of the vertical slot 231 opposite to the horizontal blind slot 232 is provided with an object placement plate supporting rod 233; one end of the object placement supporting rod 233 is fixed at the inner side of the supporting arm; and the other end is stretched out in a suspending manner; the upper surface of the object placement plate supporting rod 233 is a plane provided with a longitudinal slot.

The coil base frame 5 comprises a panel 51 and four supporting legs 52 mounted under the panel 51, wherein the panel 51 is provided with supporting foot fixing slots 511 where the barbecue oven supporting feet can be placed and a groove 512 capable of placing a third ovenware; the bottom of the groove 512 is provided with an opening 513; the supporting foot fixing slot 511 is provided with a supporting foot fixing device which is composed of a pull ring 55, an elastic member and a fixing pin 56, wherein the pull ring 55 and the fixing pin 56 are fixedly connected and mounted on the pin hole at one side of the supporting foot fixing slot 511 by the elastic member; the pull ring 55 is mounted at the outer side of the supporting foot fixing slot 511; the fixing pin 56 is mounted at the inner side of the supporting fixing slot 511; a fixing pin penetrating hole 24 is disposed at the corresponding position on the supporting foot of the barbecue oven. The length of two supporting legs 52 of the coil base frame 5 located at one side is less than that of two supporting legs 52 located at the other side; the bottoms of the two shorter supporting legs are each provided with a roller 53; the two rollers 53 are in the same size and are symmetrically mounted on the roller rotation shafts at the lower ends of the shorter supporting legs 52, and the radius of the rollers 53 is identical to the length difference of the long supporting legs and the short supporting legs. When the barbecue oven 1 is placed on the coil base frame 1, it only needs to incline the coil base frame for lifting two shorter supporting legs 52 off ground; by dragging the coil base frame 5, the barbecue oven 1 and the coil base frame 5 can be moved conveniently via the roller 53; and metal object placement net racks 54 are further erected at the lower ends of four supporting legs and at the horizontal plane where the roller rotation shafts are at; the object placement racks 54 can be used for placing objects like a fuel gas tank or a power supply and the like.

The embodiments are used for understanding the invention, but not the limitations for the invention; common technicians in the relevant fields can make a plurality of changes or versions based the technical scheme of the claims; these changes or versions should be regarded as the protection range of the invention.

What is claimed is:

1. A combined type of barbecue oven, comprising a barbecue oven which comprises an oven body opened at the underside, an oven cover, a supporting structure, an object placement device and an oil dripping plate, wherein the oven cover is mounted on the oven body which is mounted at the middle of the supporting structure; the object placement device is mounted at two sides of the supporting structure and located at two sides of the oven body; the oil dripping plate is mounted under the opening of the oven body; the combined type of barbecue oven is characterized in that:
   1) the supporting structure comprises an X-shaped front supporting frame and a back supporting frame, wherein the front and back supporting frames are symmetrically, and comprise supporting arms located at the upper side and supporting feet located at the under side; the front supporting frame and the back supporting frame are oppositely disposed and connected by a plurality of connecting ribs on the supporting feet;
   2) The object placement device:
      a) Comprises an object placement plate, wherein one end of the object placement plate is wider than the other end;
      b) the plate face of the object placement plate is upwardly, and the edges thereof are vertical to the back side direction and provided with reinforced edges; reinforced ribs vertical to the object placement plate is disposed between the reinforced edges;
      c) The bottom end of the reinforced edge is symmetrically provided with two convex rotation shafts outwardly;
   3) The combined type of barbecue oven further comprises a coil base frame provided with rollers at the bottom; the barbecue oven is mounted on the coil base frame, wherein the reinforced ribs are disposed in a longitudinal and transverse staggering manner,
   wherein two edges of the supporting arm are symmetrically provided with an object placement device supporting structure inwardly; the object placement device supporting structure:
      a) Comprises a vertical slot where the object placement plate glides up and down, wherein the width of the vertical slot is between the height of the top end of the reinforced edge and the height of the bottom end thereof;
      b) One side of the vertical slot top facing to the inner side of the coil base frame is provided with a horizontal blind slot which can contain a rotation shaft at the lower end of the reinforced edge; one side of the vertical slot opposite to the horizontal blind slot is provided with an object placement plate supporting rod.

2. The combined type of barbecue oven according to claim 1, wherein one end of the object placement plate supporting rod is fixed at the inner side of the supporting arm; and the other end is stretched out in a suspending manner.

3. The combined type of barbecue oven according to claim 2, wherein the upper surface of the object placement plate supporting rod is a plane provided with a longitudinal slot.

4. The combined type of barbecue oven according to claims 1, wherein the object placement plate supporting rod on the front supporting plate and the object placement plate supporting rod on the back supporting plate are disposed oppositely.

5. The combined type of barbecue oven according to claims 2, wherein the object placement plate supporting rod on the front supporting plate and the object placement plate supporting rod on the back supporting plate are disposed oppositely.

6. The combined type of barbecue oven according to claim 5, wherein the fixing structure is composed of a supporting foot fixing slot where the barbecue oven supporting feet can be placed and a supporting foot fixing device mounted on the supporting foot fixing slot.

7. The combined type of barbecue oven according to claim 6, wherein the lower ends of the four supporting legs are further provided with an object placement net rack.

8. The combined type of barbecue oven according to claim 5, wherein the two rollers are in the same size and are symmetrically mounted; the radius of the rollers is not less than the length difference of the long supporting legs and the short supporting legs.

9. The combined type of barbecue oven according to claim 5, wherein the lower ends of the four supporting legs are further provided with an object placement net rack.

10. The combined type of barbecue oven according to claim 9, wherein the object placement net racks are metal members.

* * * * *